Patented Feb. 21, 1939

2,147,697

UNITED STATES PATENT OFFICE 2,147,697

COATING COMPOSITION

Walter E. Gloor, South River, N. J., assignor to Hercules Powder Company, Wilmington, Del., a corporation of Delaware No Drawing. Application August 10, 1937,
Serial No. 158,433

8 Claims. (Cl. 260—16)

This invention relates to an improved lacquer composition comprising a cellulose acetopropionate or a cellulose acetobutyrate and modified alkyd synthetic resin, modified with a non-drying oil or non-drying monocarboxylic higher organic acid.

Hitherto lacquers have generally been produced with nitrocellulose as a base. However, such lacquers have suffered from various disadvantages among which may be mentioned inflammability and discoloration on exposure to heat or light. It has accordingly been proposed to use certain organic esters of cellulose, principally cellulose acetate, as a base for lacquers. Cellulose acetate and other similar cellulose esters of cellulose, however, are not very suitable for use in lacquers, because of their incompatability with most natural and, especially, with most synthetic resins, which are necessary ingredients in a lacquer for general use. Thus, for example, cellulose acetate is incompatible with various polybasic acid-polyhydric alcohol resins, phenol-formaldehyde resins, vinyl-acetate resins, etc., all of which are valuable types of lacquer resins, in the proportions necessary for the formulation of a satisfactory lacquer.

Now, in accordance with this invention, it has been found that cellulose acetopropionate and cellulose acetobutyrate, mixed esters of cellulose, are compatible to a marked degree with various of the synthetic resins commonly used in nitrocellulose lacquers, although, as has been said, cellulose acetate, and its homologues are incompatible with these resins. I have further found that lacquers containing cellulose acetopropionate and cellulose acetobutyrate and a synthetic resin of the class of non-drying oil modified aromatic polybasic acid-polyhydric alcohol resins and of non-drying monocarboxylic higher organic acid modified aromatic polybasic acid-polyhydric alcohol resins are of remarkably good resistance to discoloration by light and heat, and to failure by weathering.

The improved lacquer composition, in accordance with this invention, will comprise a cellulose acetopropionate or a cellulose acetobutyrate, a solvent, and a non-drying oil modified aromatic polybasic acid-polyhydric alcohol synthetic resin compatible therewith, such as, for example, a non-drying oil modified glycerol phthalate resin, a non-drying oil modified glycerol-glycol phthalate resin, a non-drying oil modified glycol phthalate resin, etc. The non-drying oil with which these resins are modified may be, for example, cocoanut oil, cottonseed oil, caster oil, etc. Equivalently, the resin used in my compositions may be a non-drying monocarboxylic higher organic acid modified aromatic polybasic acid-polyhydric alcohol synthetic resin compatible with the cellulose acetobutyrate or the cellulose acetopropionate contained therein, such as, for example, a non-drying monocarboxylic higher organic acid-modified glycerol-phthalate resin, a non-drying monocarboxylic higher organic acid modified glycerol glycol-phthalate resin, a non-drying monocarboxylic higher organic acid, a non-drying monocarboxylic higher organic acid modified glycol-phthalate resin, etc. The non-drying monocarboxylic higher organic acid with which these resins are modified may be fatty acids derived from a non-drying oil, monocarboxylic aromatic acids, etc., as, for example, benzoic acid, cocoanut oil fatty acids, cottonseed oil fatty acids, castor oil fatty acids, etc.

The cellulose acetopropionate which may be used may, for example, have an acetyl-propionyl content within the range of about 30% acetyl, 17% propionyl to about 10% acetyl, 35% propionyl, while the cellulose acetobutyrate which I may use may have an acteylbutyryl content within the range of about 35% acetyl, 12% butyryl to about 11% acetyl, 39% butyryl.

Usually a plasticizer, as, for example, dibutyl phthalate, triethyl citrate, methyl phthalyl methyl glycollate, etc., will be included, but in some instances the plasticizer may desirably be omitted. Pigments, etc., may be added, if desired. Any solvent, or mixture of solvents, having a solvent action in the ingredients, as, for example, acetone, ethylene dichloride, toluol, methyl cellosolve acetate, ethyl acetate, etc., may be used.

The proportions of the various ingredients may be widely varied, depending upon the particular use for which the lacquer is intended, but in order to produce a homogeneous, hard, adhesive film from the lacquer the total amount of modified resin and plasticizer should not exceed about 75% of the total solids in the lacquer, and the quantity of plasticizer should not exceed the amount of resin present.

I prefer to add the modified resin in amounts within the range of about 50% to about 100% by weight of the cellulose mixed ester present and the plasticizer, when one is used, in amounts within the range of about 20% to about 60% by weight of the cellulose mixed ester present. When I use a pigment, I prefer to add it in amount of from about 50% to about 100% by weight of the cellulose mixed ester present.

The formulae given below are illustrative of the practical embodiment of this invention and represent compositions having spraying viscosities.

|  | A | B | C | D |
|---|---|---|---|---|
| Cellulose acetobutyrate (31.7% acetyl, 16.5% butyryl) | 10 | 10 | 10 | 10 |
| Glycerol-phthalic anhydride benzoic acid modified resin | 5 | 10 | 5 | 7 |
| Dibutyl phthalate | 2 | 4 | 5 | |
| Solvent | 83 | 76 | 80 | 83 |
| Hardness of film on Pfund hardness meter, 0.002" film thickness | 220 | 30 | 30 | 200 |
| Solvent formula:— | | | | |
| Acetone | | 25 | | |
| Ethyl acetate | | 24 | | |
| Acetic ester of ethylene glycol monomethyl ether | | 17 | | |
| Toluol | | 34 | | |

These formulae typify a clear, hard lacquer which is unusually resistant to wear. All lasted over fifteen months on outdoor exposure tests.

The following formulae illustrate pigmented lacquers which are exceptionally free from "chalking" in comparison to other lacquers embodying the same pigment.

|  | E | F |
|---|---|---|
| Cellulose acetobutyrate (31.7% acetyl—16.5% butyryl) | 8.0 | 8.0 |
| Dibutylphthalate | 4.8 | 4.8 |
| Glycerol-phthalic anhydride-benzoic acid modified resin | 8.0 | 8.0 |
| TiO₂ pigment | 4.0 | 8.0 |
| Acetone | 18.7 | 18.7 |
| Ethyl lactate | 5.0 | 5.0 |
| Ethylene dichloride | 15.0 | 15.0 |
| Methyl cellosolve acetate | 15.0 | 15.0 |
| Toluol | 21.5 | 17.5 |

Formula E showed only 0.2 mg. and formula F, 1.4 mg. chalking after 360 hours exposure in comparison to usual values in other lacquers for the same amount of titanium dioxide of from 1.5 to 5.0 mg. in 220 hours.

The glycerol-phthalic anhydride benzoic acid modified resin used in the above formulae A—F, inclusive, may be replaced, for example, with a glycol-glycerol phthalic anhydride resin modified with benzoic acid, a glycol-glycerol phthalic anhydride resin modified with cottonseed oil, a glycol-glycerol phthalic anhydride resin modified with cocoanut oil, the correspondingly modified glycol-phthalic anhydride resins, etc., with changes in the plasticizer content to compensate for the hardness of the particular resin chosen, and equally satisfactory coating compositions obtained.

The formulae given below are further illustrative of the practical embodiment of this invention, and represent compositions having spraying viscosities:

|  | G | H | I |
|---|---|---|---|
| Cellulose acetopropionate (15.7% acetyl, 29.5% propionyl) | 12 | 12 | 12 |
| Glycerol phthalate resin modified with 37% benzoic acid | 5.4 | | |
| Glycol phthalate resin modified with cotton seed oil | | 5.4 | |
| Glycerol glycol phthalate resin modified with cocoanut oil | | | 5.4 |
| Dibutyl phthalate | 2.6 | 2.6 | 2.6 |
| Butyl acetate | 18 | 18 | 18 |
| Ethyl acetate | 14 | 14 | 14 |
| Ethyl alcohol (2-B denatured) | 10 | 10 | 10 |
| Butanol | 6 | 6 | 6 |
| Toluol | 32 | 32 | 32 |

In any of the above formula, the modified phthalate resins shown may be replaced, for example, by modified phthalate resins formed by reaction of phthalic anhydride with either glycerol, or glycol or mixtures thereof and modification with cottonseed oil, cocoanut oil, castor oil, the non-drying fatty acid mixtures derived from these oils, benzoic acid, etc., with changes in the plasticizer content to compensate for the hardness of the particular resin chosen.

This application is a continuation-in-part of my application, Serial Number 753,304, filed November 16, 1934, which matured into U. S. Patent 2,111,446, granted Mar. 15, 1938.

What I claim and desire to protect by Letters Patent is:

1. A lacquer comprising a cellulose mixed ester selected from the group consisting of cellulose acetopropionate having an acetyl-propionyl content within the range of about 30% acetyl, 17% propionyl to about 10% acetyl, 35% propionyl and cellulose acetobutyrate having an acetyl-butyryl content within the range of about 35% acetyl, 12% butyryl to about 11% acetyl, 39% butyryl; a solvent and an aromatic polybasic acid-polyhydric alcohol resin modified with a material selected from the group consisting of non-drying oils and non-drying monocarboxylic higher organic acids; the said ingredients being so proportioned and in amount sufficient to cooperate to give the composition the characteristic of depositing a weather-resistant, non-discoloring film.

2. A lacquer comprising a cellulose mixed ester selected from the group consisting of cellulose acetopropionate having an acetyl-propionyl content within the range of about 30% acetyl, 17% propionyl to about 10% acetyl, 35% propionyl and cellulose acetobutyrate having an acetyl-butyryl content within the range of about 35% acetyl, 12% butyryl to about 11% acetyl, 39% butyryl; a solvent and a phthalic anhydride-polyhydric alcohol resin modified with a non-drying oil; the said ingredients being so proportioned and in amount sufficient to cooperate to give the composition the characteristic of depositing a weather-resistant, non-discoloring film.

3. A lacquer comprising a cellulose mixed ester selected from the group consisting of cellulose acetopropionate having an acetyl-propionyl content within the range of about 30% acetyl, 17% propionyl to about 10% acetyl, 35% propionyl and cellulose acetobutyrate having an acetyl-butyryl content within the range of about 35% acetyl, 12% butyryl to about 11% acetyl, 39% butyryl; a solvent and a phthalic anhydride-polyhydric alcohol resin modified with a non-drying monocarboxylic higher organic acid; the said ingredients being so proportioned and in amount sufficient to cooperate to give the composition the characteristic of depositing a weather-resistant, non-discoloring film.

4. A lacquer comprising a cellulose mixed ester selected from the group consisting of cellulose acetopropionate having an acetyl-propionyl content within the range of about 30% acetyl, 17% propionyl to about 10% acetyl, 35% propionyl and cellulose acetobutyrate having an acetyl-butyryl content within the range of about 35% acetyl, 12% butyryl to about 11% acetyl, 39% butyryl; a solvent; an aromatic polybasic acid-polyhydric alcohol resin modified with a non-drying oil in amount within the range from about 50% to about 100% by weight of the cellulose mixed ester and a plasticizer within the range of about 20% to about 60% by weight of the cellulose mixed ester; the said ingredients being so proportioned to give the composition the characteristic of depositing a weather-resistant, non-discoloring film.

5. A lacquer comprising a cellulose mixed ester selected from the group consisting of cellulose acetopropionate having an acetyl-propionyl content within the range of about 30% acetyl, 17% propionyl to about 10% acetyl, 35% propionyl and cellulose acetobutyrate having an acetyl-butyryl content within the range of about 35% acetyl, 12% butyryl to about 11% acetyl, 39% butyryl; a solvent; an aromatic polybasic acid-polyhydric alcohol modified with a non-drying oil, in amount about equal by weight to that of the cellulose mixed ester, a plasticizer in amount of about 60% by weight of the cellulose mixed ester and a pigment in amount of from about 50% to about 100% by weight of the cellulose mixed ester; the said ingredients being so proportioned to give the composition the characteristic of depositing a weather-resistant, non-discoloring, non-chalking film.

6. A lacquer comprising a cellulose mixed ester selected from the group consisting of cellulose acetopropionate having an acetyl-propionyl content within the range of about 30% acetyl, 17% propionyl to about 10% acetyl, 35% propionyl and cellulose acetobutyrate having an acetyl-butyryl content within the range of about 35% acetyl, 12% butyryl to about 11% acetyl, 39% butyryl; a solvent; an aromatic polybasic acid-polyhydric alcohol resin modified with a non-drying monocarboxylic higher organic acid in amount within the range of about 50% to about 100% by weight of the cellulose mixed ester and a plasticizer within the range of about 20% to about 60% by weight of the cellulose mixed ester; the said ingredients being so proportioned to give the composition the characteristic of depositing a weather-resistant, non-discoloring film.

7. A lacquer comprising a cellulose mixed ester selected from the group consisting of cellulose acetopropionate having an acetyl-propionyl content within the range of about 30% acetyl, 17% propionyl to about 10% acetyl, 35% propionyl and cellulose acetobutyrate having an acetyl-butyryl content within the range of about 35% acetyl, 12% butyryl to about 11% acetyl, 39% butyryl; a solvent; an aromatic polybasic acid-polyhydric alcohol modified with a non-drying monocarboxylic higher organic acid in amount about equal to the weight of the cellulose mixed ester; a plasticizer in amount of about 60% by weight of the cellulose mixed ester and a pigment in amount within the range of about 50% to about 100% by weight of the cellulose mixed ester; the said ingredients being so proportioned to give the composition a characteristic of depositing a weather-resistant, non-discoloring, non-chalking film.

8. A lacquer comprising a cellulose acetobutyrate having an acetyl-butyryl content within the range of about 35% acetyl, 12% butyryl to about 11% acetyl, 39% butyryl, a solvent and an aromatic polybasic acid-polyhydric alcohol resin modified with a material selected from the group consisting of non-drying oils and non-drying monocarboxylic higher organic acids, the said ingredients being so proportioned to give the composition the characteristic of depositing a weather-resistant, non-discoloring film.

WALTER E. GLOOR.